Figure 1:
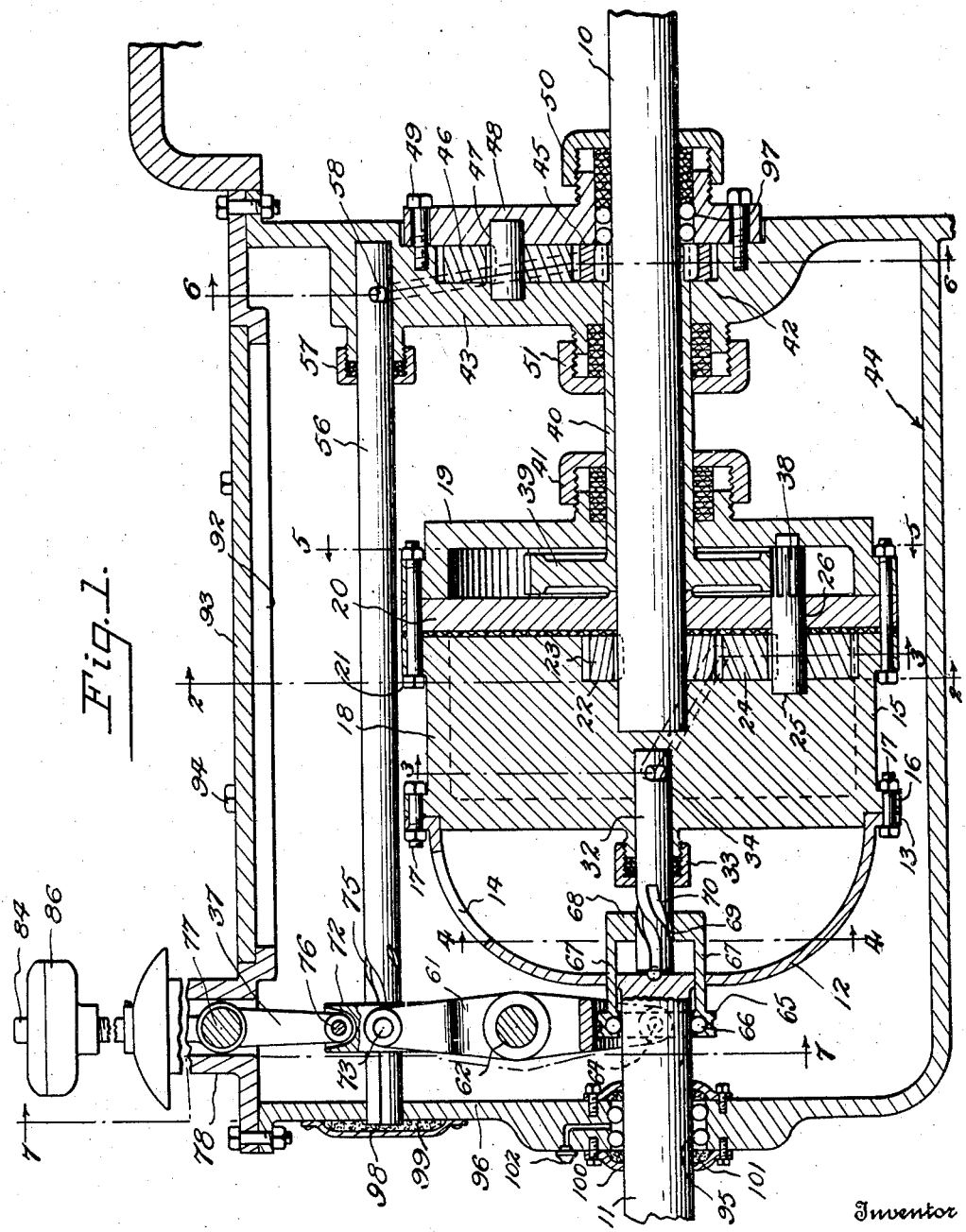

Feb. 27, 1934.    F. R. EWER    1,948,656
VARIABLE SPEED TRANSMISSION
Filed Sept. 3, 1932    4 Sheets-Sheet 1

Inventor
F. R. Ewer
By Lacey & Lacey, Attorneys

Feb. 27, 1934.  F. R. EWER  1,948,656
VARIABLE SPEED TRANSMISSION
Filed Sept. 3, 1932  4 Sheets-Sheet 2
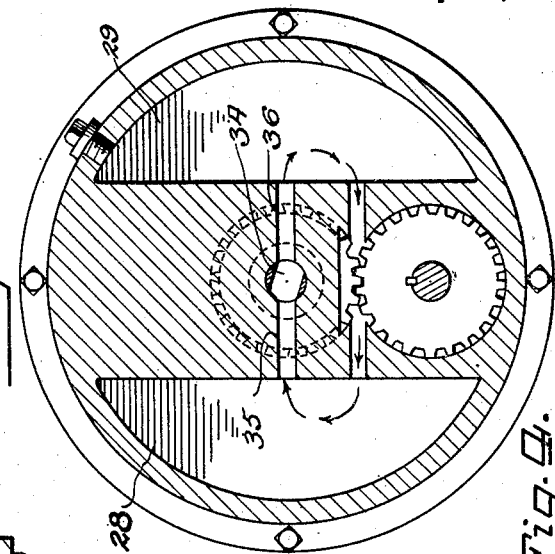
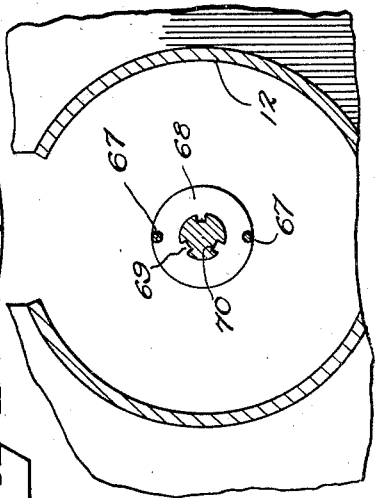
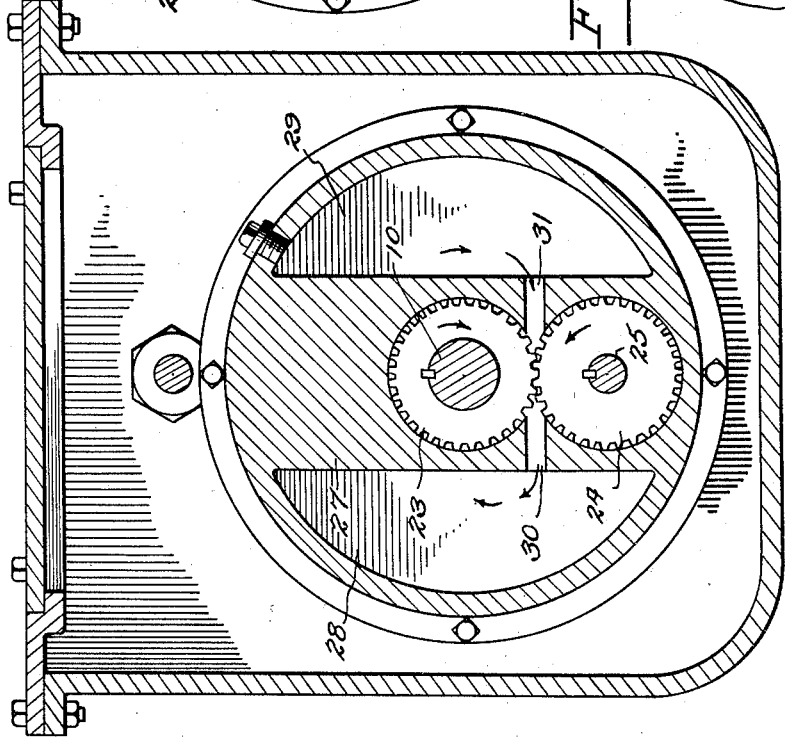
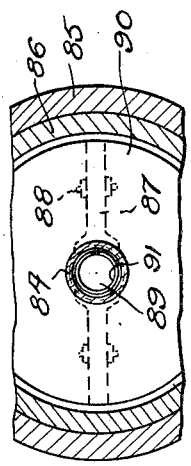
Inventor
F R Ewer
By Lacey & Lacey, Attorneys

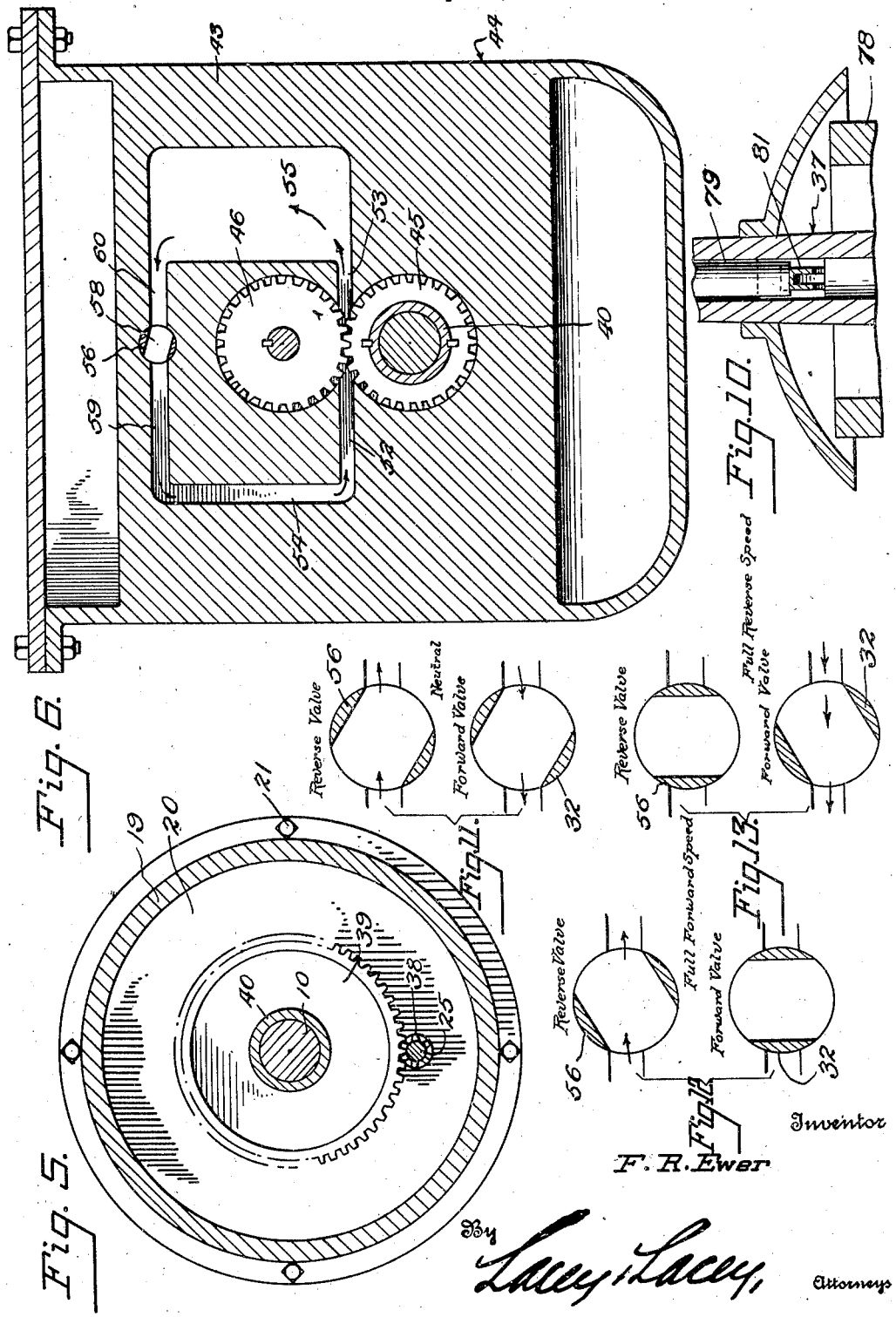

Feb. 27, 1934.　　　F. R. EWER　　　1,948,656
VARIABLE SPEED TRANSMISSION
Filed Sept. 3, 1932　　4 Sheets-Sheet 4
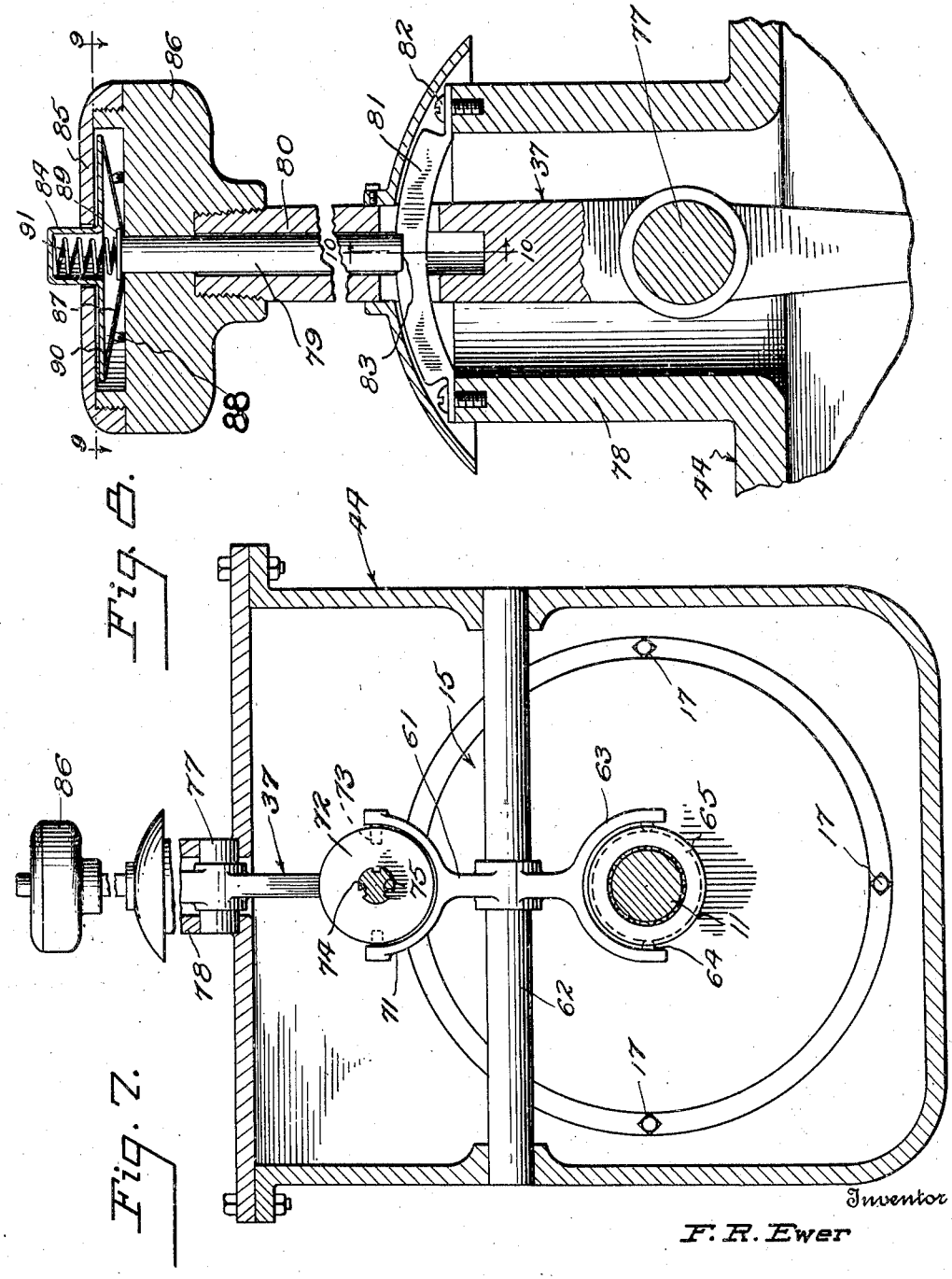

Patented Feb. 27, 1934

1,948,656

UNITED STATES PATENT OFFICE 1,948,656

VARIABLE SPEED TRANSMISSION

Frank R. Ewer, Modesto, Calif.

Application September 3, 1932. Serial No. 631,690

8 Claims. (Cl. 74—34)

This invention relates to variable speed transmissions and has for an object to provide mechanism in which the relative speed of rotation of the driven shaft with relation to the rotation of the driving shaft is effected by controlling the flow of oil through the mechanism.

A further object is to provide rotary pumps controlled by novel valves, constituting forward and reverse valves, and which regulate the amount of oil which the pumps are permitted to circulate through the mechanism for regulating the speeds of rotation of the driving and driven shafts relatively to each other.

A further object is to provide a novel shift lever for operating the valves, the shift lever being so constructed that when in neutral position it will be locked and maintain both the forward and reverse valves open.

A further object is to provide a variable speed transmission in which the parts are easily accessible for proper adjustment and which will be composed of a small number of rugged and durable parts that will not easily get out of order.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawings forming part of this specification,

Figure 1 is a longitudinal section of a variable speed transmission embodying the invention, Figure 2 is a vertical cross section taken on the line 2—2 of Figure 1, Figure 3 is a vertical cross section taken on the line 3—3 of Figure 1, Figure 4 is a vertical cross section taken on the line 4—4 of Figure 1, Figure 5 is a vertical cross section taken on the line 5—5 of Figure 1, Figure 6 is a vertical cross section taken on the line 6—6 of Figure 1, Figure 7 is a vertical cross section taken on the line 7—7 of Figure 1, Figure 8 is an enlarged vertical section through the shift lever, Figure 9 is a detail horizontal section taken on the line 9—9 of Figure 8, Figure 10 is a detail vertical section taken on the line 10—10 of Figure 8, Figure 11 is a diagrammatic view showing the neutral position of both valves, Figure 12 is a diagrammatic view showing the full forward speed position of both valves, and Figure 13 is a diagrammatic view showing the full reverse speed position of both valves.

Referring now to the drawings in which like characters of reference designate similar parts in the various views, 10 designates the motor or drive shaft, and 11 designates the driven shaft. The driven shaft is provided with an integral dished cap 12 which is provided with a flange 13 and which is also provided with a handhole 14 through which access to the interior of the cap may be had.

The drive shaft 10 is journaled at the end in a casing 15 which is provided with a flange 16 through which, and the flange 13 of the driven shaft, bolts 17 are passed so that the casing drives the driven shaft.

The casing 15 is preferably formed of three parts including hollow end sections 18 and 19 and a disk intermediate section 20, all of the sections being removably secured together by means of bolts 21.

The end section 18 of the casing is provided with a recess 22 in which a rotary pump is mounted. As best shown in Figures 1 and 2, the pump comprises a gear 23 which is keyed to the drive shaft 10 and a gear 24 which is keyed to an arbor 25 and meshes with the gear 23. The ends of the arbor are journaled in both end sections 18 and 19 and the arbor passes through a bearing opening 26 in the intermediate section 20. As shown in Figure 2, a central partition 27 divides the end section 18 of the casing into oppositely disposed reservoirs 28 and 29 and communication between these reservoirs is established by passages 30 and 31 which are intercepted by the meshing teeth of the rotary pump gears 23 and 24. The reservoirs are preferably filled with oil and the oil is pumped from one reservoir to the other in a direction corresponding to the direction of rotation of the pump gears.

If the pump gears are unrestricted when the drive shaft 10 is rotated, the gear 23 will rotate the gear 24 without transmitting motion to the casing 15, cap 12, and driven shaft 11. If the pump gears are restricted and prevented from rotation, however, the gears become more or less firmly locked together, depending upon the amount of restriction, and under this condition the casing 15, surrounding the gears, is revolved and drives the driven shaft in the same direction as the drive shaft, that is, clockwise direction.

When the restriction is limited the driven shaft will be rotated at a speed with respect to the drive shaft, depending upon the amount of restriction of rotation of the pump gears. This restriction is effected by a valve 32 which controls the amount of oil which is allowed to be pumped from one reservoir to the other by the gears, as will now be described.

The valve 32 is of the cock type and is passed through a stuffing box 33 into the end section 18 of the casing in alignment with the drive shaft 10. A port 34 is formed transversely through the valve and, as best shown in Figure 3, there are passages 35 and 36 formed in the division wall 27 which connect the reservoirs 28 and 29 through this port when the valve is turned to full open position, so that the oil may be pumped from one reservoir to the other by rotation of the pump gears. The valve is adapted to be turned by manipulation of a shift lever, designated in general by the numeral 37, which will later be described in detail.

When the oil is pumped freely by the pump gears through the port 34 the gears merely rotate on their axes and the gear casing 15 and the driven shaft 11 remain stationary. If the valve is shut so that no oil can flow past it the pumping actuation of the gears is prevented. Under these circumstances, the gears are clutched or locked and cannot rotate on their axes, but will cause the gear casing to revolve and thus drive the driven shaft 11. Should the valve 32 be partly opened, the pumping actuation of the gears will be partly restricted, and the driven shaft 11 will be rotated with a speed proportionately to the amount of oil that can be pumped by the gears through the partly opened valve. Thus the speed of the driven shaft depends upon the amount the valve is opened.

For reversing the direction of rotation of the driven shaft 11 with respect to the drive shaft 10, the arbor 25 is provided with gear teeth 38, as shown in Figure 1, which mesh with a gear 39, that is disposed within the end section 19 of the gear casing and is provided with an integral sleeve 40 which is loosely mounted on the drive shaft 10 and passes through a stuffing box 41 carried by the end section 19 of the gear casing. The sleeve enters a cavity 42 in the front end wall 43 of the transmission housing which is designated in general by the numeral 44. A rotary pump is mounted in this cavity and comprises a gear 45 which is keyed to the sleeve 40 and a gear 46 which is mounted on an arbor 47 that is journaled in the end wall 43 at one end, and at the opposite end is journaled in a closure plate 48 which is secured to the housing by bolts 49 and is equipped with a stuffing box 50 through which the drive shaft 10 passes. A similar stuffing box 51 on the end wall 43 seals the sleeve 40 oil tight.

The meshing teeth of the rotary pump gears 45 and 46, it will be seen by referring to Figure 6, intercept passages 52 and 53 which communicate with reservoirs 54 and 55 formed in the end wall 43 of the housing.

A reversing valve 56 controls the flow of oil from one of these reservoirs to the other. The reversing valve is also of the plug or cock type and is in the nature of a slender shaft which extends through the housing 44 and is journaled at the forward end in a bearing in the front wall of the housing which is sealed by a stuffing box 57. The valve is provided with a port 58 which controls flow from one reservoir to the other through passages 59 and 60. Since the operation of this valve and its effect on the pump gears is identical with the similar valve 32, above described, the description will not be repeated. It will be observed, by comparing Figures 2 and 6, that the pump gear 45, which is keyed to the sleeve 40, rotates in the same direction as the drive shaft. Consequently, when the pump gears 45 and 46 are locked stationary by complete closing of the valve 56, the sleeve 40 and gear 39 are locked stationary, and the arbor 26 will be moved as a planetary gear around the gear 39 oppositely to the direction of the drive shaft 10 and carry the gear casing 15 with it counterclock or reverse to the direction of rotation of the drive shaft.

The valves 32 and 56 are so set that when one is completely opened the other will be completely closed. This may best be visualized by referring to Figures 12 and 13. When the valve 32 is closed the reverse valve 56 will be opened and this is the condition of the valves during full forward speed. When the forward valve 32 is opened the reverse valve 56 will be closed, and this is the condition of the valves during the full reverse speed. As shown in Figure 11, both the forward valve 32 and the reverse valve 56 are open in the neutral condition of the valves. In the neutral condition of the valves the flow of oil from the respective reservoirs through the valves is unrestricted and the driven shaft 11 is declutched from the drive shaft 10.

The valves 32 and 56 are set by means of a shipper 61, best shown in Figures 1 and 7. The shipper is pivoted centrally on a stub shaft 62 which is journaled at its ends in the sides of the transmission housing 44. The shipper is provided below the shaft with a yoke 63, which is provided with gudgeons 64. A ring 65 surrounds the driven shaft 11 and has bearing openings at opposite points to receive the gudgeons. The ring is provided with anti-friction bearings 66 which ride on the driven shaft 11. Fingers 67 project from the ring and pass through the dished cap 14 of the driven shaft. These fingers are connected by a disk 68, best shown in Figure 4, which is bored out to receive the forward speed valve 32. The disk is splined on the valve by means of interfitting spiral splines 69 on the disk and spiral grooves 70 on the valve. When the ring is shifted by the shipper in either direction the valve will be rotated correspondingly.

The shipper is provided at the top with a yoke 71, best shown in Figure 7. A disk 72 is mounted on gudgeons 73 carried by the yoke. This disk, like the disk 68 just described, is splined on the reverse valve 56 by means of interfitting spiral splines 74 carried by the disk and spiral grooves 75 carried by the valve.

As shown in Figure 1, the shift lever 37 is pivotally connected to the disk 72 by means of a pivot pin 76. When the shift lever is rocked the shipper 61 will be rocked on its stub shaft 62. The upper disk 72 will thereby be moved in one direction and the disk 68 will be simultaneously moved in the opposite direction. The splines of the valves are cut with straight portions so that forward movement of the shift lever will only manipulate the forward valve 32 and rearward movement of the lever will only manipulate the reverse valve 56, one valve at a time being operated by the spiral portion of its spline, the other valve being held wide open by the straight portion of its spline. In neutral position of the shipper both valves are wide open.

The shift lever 37 is pivoted on a pivot pin 77 which is mounted in a boss 78 carried by the transmission housing 44. For locking the shift lever in neutral position a push rod 79, best shown in Figure 8, is mounted in an axial opening 80 formed in the top of the lever. An arched rack 81 of inverted U-shape in cross section, as best shown in Figure 10, is secured at its ends to the boss 76 by means of screws 82. The rack is provided with a central notch 83, which receives the push rod 79 and locks the shift lever in neutral position.

For operating the push rod a button 84 is mounted in a central opening formed in the cover plate 85 of a recessed knob 86 which is threaded on to the shift lever. Within the recess of the knob a pair of levers 87 are pivoted centrally, as shown at 88, and the inner ends of these levers engage underneath a flange 89 formed on the push rod. The outer ends of the levers abut a disk 90 which is formed integral with the button 84. A helical spring 91 is mounted in the button and seated on the flange 89 of the push rod.

When the button 84 is depressed, the flange 90 will rock the levers 87, which in turn push up the flange 89 and disengage the push rod 79 from the notch 83 in the rack so that the shift lever may be manipulated. Each time the shift lever is returned to neutral the push rod will be urged into the notch 83 by the spring 91.

The transmission housing 44 is provided with a handhole 92 which is closed by a cover plate 93 that is bolted, as shown at 94, to the top of the housing and provides a means of access to the interior of the housing for adjusting the various stuffing boxes and other purposes. The handhole 14 in the driven shaft cap 12 provides means for adjusting the stuffing box 33. Anti-friction bearings 95 are mounted in the bearing openings of the driven shaft 11 in the rear wall 96 of the housing. Anti-friction bearings 97 are mounted in the bearing opening in the front closure plate 48 of the housing and surround the drive shaft 10. The end of the reverse valve 56, which is journaled in the rear wall 96 of the housing, is sealed leak proof by means of a cap 98 which confines a packing material 99 against the end of the shaft, as shown. A similar cap 100 and packing material 101 on the rear wall of the housing seals the driven shaft 11 oil tight. Lubricators, as shown at 102, may be used wherever necessary.

Since the operations of the various pumps, and the valves for controlling the pumps have been described as the description progressed, it is thought that the invention will be fully understood without further explanation.

What is claimed is:

1. In a variable speed transmission, a housing, a drive shaft, a driven shaft, a rotary casing in the housing fixed to the driven shaft and receiving the end of the drive shaft, reservoirs in the casing and in the housing, a rotary gear pump in the casing driven by the drive shaft, a rotary gear pump in the housing, said pumps circulating fluid through their respective reservoirs, valves in the casing and housing for controlling the fluid flow to restrict the pump gears, a gear loose on the drive shaft for driving the housing pump, and an arbor carried by the casing and driven by the casing pump, said arbor having gear teeth meshing with said loose gear and connecting the drive shaft, the casing, and the driven shaft for rotation in the same direction when the casing pump is restricted, said arbor moving as a planetary gear upon said loose gear when the housing rotary pump is restricted and reversing the direction of rotation of the casing and the driven shaft with respect to the drive shaft.

2. In a variable speed transmission, a housing, a rotary casing therein, a drive shaft projecting into the housing and entering the casing, a driven shaft entering the housing and fixed to the casing, a pair of fluid reservoirs in the casing, a pair of fluid reservoirs in the housing, a rotary gear pump in the casing driven by the drive shaft for circulating fluid from one reservoir to the other in the casing, a rotary gear pump in the housing for circulating fluid from one reservoir to the other in the housing, valves in the casing and housing for restricting the amount of fluid allowed to be pumped whereby to restrict the pump gears, a loose gear on the drive shaft having a sleeve integral with one of the housing pump gears for driving said housing pump, and an arbor fixed to one of the casing pump gears and passing through a bearing opening in the casing and having gear teeth on the outer end meshing with said loose gear, said arbor performing the dual function of direct connecting the drive shaft with the driven shaft when the casing pump is restricted and moving as a planetary gear upon said loose gear to reverse the direction of rotation of the driven shaft with respect to the drive shaft when the housing pump is restricted.

3. In a variable speed transmission, a housing, a drive shaft, a driven shaft, a rotary casing in the housing loose on the drive shaft and fixed to the driven shaft, a pair of reservoirs in the casing, a pair of reservoirs in the housing, pump gears in the casing for circulating fluid through the casing reservoirs, one of the gears being fixed to the drive shaft, an arbor driven by the other gear and passing through a bearing opening in the casing and equipped with gear teeth at one end, pump gears in the housing for circulating fluid through the housing reservoirs, a gear loose on the drive shaft and meshing with the gear teeth of the arbor, a sleeve integral with the loose gear and surrounding the drive shaft, one of the pump gears in the housing being fixed to said sleeve, valves in the casing and housing for limiting the amount of fluid which is allowed to be pumped whereby to restrict the casing pump gears and the housing pump gears independently of each other, and a shift lever operatively connected to the valves to close one of the valves and open the other of the valves, one of the valves when closed locking the gears in the casing whereby said arbor connects the drive shaft and the driven shaft for rotation in the same direction, and the other of said valves when closed locking the gears in the housing whereby said arbor travels upon the loose gear as a planetary gear and reverses the direction of rotation of the driven shaft relative to the drive shaft.

4. In a variable speed transmission, a housing, a driven shaft, a drive shaft, a rotary casing in the housing loose on the drive shaft and fixed to the driven shaft, an arbor passing through a bearing opening in said casing, meshing pump gears on said drive shaft and said arbor, reservoirs in the casing on opposite sides of the pump gears through which fluid is circulated by the pump gears, said arbor having gear teeth on one end, meshing pump gears carried by the housing, reservoirs in the housing through which fluid is circulated by said housing pump gears, a gear loose on the drive shaft and meshing with the gear teeth of the arbor, a sleeve integral with said loose gear and surrounding the drive shaft, one of the pump gears of the housing being fixed to said sleeve, rotary valves for controlling the fluid flow whereby to restrict the casing pump gears independently of the housing pump gears, said arbor connecting the drive shaft and the driven shaft for rotation in the same direction when the casing pump gears are restricted, said arbor traveling upon the loose gear as a planetary gear to reverse the direction of rotation of the driven shaft with respect to the drive shaft when the housing pump gears are restricted, a shift lever, and means operatively connecting the lever with the valves for rotating the valves axially when the shift lever is rocked.

5. In a variable speed transmission, a housing, a drive shaft, a driven shaft, a rotary casing in the housing loose on the drive shaft and fixed to the driven shaft, reservoirs in the casing and in the housing, rotary pump gears in the casing and in the housing for recirculating fluid through the reservoirs, gears operatively connecting the pump gears of the housing and the casing and being adapted to rotate the casing in one direction when the casing pump gears are locked and in a reverse direction when the housing pump gears are locked, and means for restricting the pump gears of the casing and the housing independently of each other and preventing the same from rotation comprising a forward valve, a reverse valve, collars splined on the valves, each spline having a spiral portion and a straight portion, and means for shifting the collars to rotate the valves through the spiral splines or hold the valves stationary through the straight portion of the splines.

6. In a variable speed transmission, a housing, a drive shaft, a driven shaft, a rotary casing in the housing loose on the drive shaft and fixed to the driven shaft, reservoirs in the casing and in the housing, rotary pump gears in the casing and in the housing for circulating fluid through the reservoirs, gears operatively connecting the pump gears of the housing and of the casing and being adapted to rotate the casing in one direction when the casing pump gears are locked and in a reverse direction when the housing pump gears are locked, and means for restricting the pump gears of the casing and the housing independently of each other and preventing the same from rotation comprising a forward valve, a reverse valve, collars splined on the valves, a centrally pivoted lever having terminal yokes connected to said collars, said collars having spiral spline connections with said valves for rotating the valves axially when said lever is shifted on its pivot, and a shift lever pivotally connected to the yoked lever.

7. In a variable speed transmission, a housing, a drive shaft, a driven shaft, a rotary casing in the housing loose on the drive shaft and fixed to the driven shaft, rotary pump gears in the housing and in the casing, a forward valve in the casing, a reverse valve in the housing, said valves retarding fluid flow and restricting the pump gears against rotation on their axes for connecting the drive shaft to the driven shaft for forward or reverse rotation, a centrally pivoted shipper in the housing having terminal yokes embracing the valves, collars on the yokes splined to the valves, and a shift lever pivoted to one of the collars, movement of the shift lever rocking the shipper on its pivot to simultaneously move one of the collars in one direction and the other of the collars in the opposite direction, the splines between the collars and the valves each having a spiral portion and a straight portion whereby movement of the shift lever in one direction will only manipulate the forward valve and movement of the lever in the opposite direction will only manipulate the reverse valve, one valve at a time being operated by the spiral portion of its spline while the other valve is held wide open by the straight portion of its spline, in neutral position of the shipper both valves being held wide open.

8. In a variable speed transmission, a housing, a drive shaft, a driven shaft, a rotary casing in the housing loose on the drive shaft and fixed to the driven shaft, a forward valve in the casing, pump gears in the casing and in the housing, a reverse valve in the housing, said valves retarding fluid flow and restricting the pump gears against rotation on their axes for connecting the drive shaft to the driven shaft for forward or reverse rotation, a centrally pivoted shipper in the housing having terminal yokes embracing the valves, collars on the yokes splined to the valves, a shift lever pivoted to one of the collars, a boss carried by the housing and surrounding the shift lever, a rack within the boss, and a spring pressed push rod mounted to slide in a counterbore formed in the shift lever and adapted to engage said rack in neutral position of the shift lever and hold said shipper in neutral position to maintain both the forward and the reverse valve in wide open condition so that both pump gears are unrestricted and the drive shaft idles with respect to the driven shaft.

FRANK R. EWER. [L. s.]